United States Patent [19]

Schmidt et al.

[11] 4,225,456
[45] Sep. 30, 1980

[54] WATER-IN-OIL EMULSION DEFOAMER COMPOSITIONS, THEIR PREPARATION AND USE

[75] Inventors: William T. Schmidt, Boonton; Charles T. Gammon, Sparta, both of N.J.

[73] Assignee: Diamond Shamrock Corporation, Dallas, Tex.

[21] Appl. No.: 957,695

[22] Filed: Nov. 6, 1978

[51] Int. Cl.$^2$ ............................................. B01D 19/04
[52] U.S. Cl. ............................... 252/321; 162/168 N; 162/168 R; 252/314; 252/358; 260/29.6 R
[58] Field of Search ................................ 252/321, 358

[56] References Cited

U.S. PATENT DOCUMENTS

| | | | |
|---|---|---|---|
| 2,715,614 | 8/1955 | Snook | 252/358 |
| 2,843,551 | 7/1958 | Leonard et al. | 252/321 X |
| 3,652,453 | 3/1972 | MacDonnell | 252/321 X |
| 3,677,963 | 7/1972 | Lichtman et al. | 252/321 X |
| 4,021,365 | 5/1977 | Sinka et al. | 252/321 |
| 4,032,473 | 6/1977 | Berg et al. | 252/321 X |
| 4,107,073 | 8/1978 | Maciaszek | 252/358 X |

*Primary Examiner*—Richard D. Lovering
*Attorney, Agent, or Firm*—Leslie G. Nunn, Jr.

[57] ABSTRACT

Water based defoamer compositions which are invert (water in oil) emulsions containing quick-chilled amides, hydrophobic silica, polymers, emulsifiers, oil and water are useful in defoaming aqueous systems such as found in the kraft pulping process. Optionally, these defoamer compositions may contain silicone surfactants, formaldehyde solution and silicone oil.

15 Claims, No Drawings

WATER-IN-OIL EMULSION DEFOAMER COMPOSITIONS, THEIR PREPARATION AND USE

BACKGROUND OF THE INVENTION

1. Field of the Invention

This invention relates to water based defoamer compositions and their use in defoaming aqueous systems containing foam producing solids.

2. Description of the Prior Art

U.S. Pat. No. 2,715,614—Snook, issued Aug. 16, 1955 describes a defoamer composition for paper machines which is a white semi-fluid aqueous emulsion containing a paraffin hydrocarbon having at least 12 carbon atoms, a partial ester of a polyhydric alcohol and a fatty acid having 14 to 22 carbon atoms, an ester of a monohydric alcohol having less than 9 carbon atoms and a fatty acid having 14 to 22 carbon atoms, an ester of a polyethylene glycol having a molecular weight of from about 200 to about 4000 and a fatty acid having from 14 to 22 carbon atoms and water.

U.S. Pat. No. 2,843,551—Leonard et al, issued July 15, 1958 describe a defoamer composition for latex paint which is a cream colored paste containing a paraffin hydrocarbon, an ester of a polyethylene glycol having a molecular weight greater than 400 and a fatty acid having from 12 to 22 carbon atoms, an aliphatic carboxylic acid having from 6 to 22 carbon atoms and a hydrocarbon soluble organopolysiloxane having from 1 to 3 alkyl radicals per silicon atom and water.

U.S. Pat. No. 3,652,453—MacDonnell, issued Mar. 28, 1972 describes a water based defoamer composition containing quick-chilled amide, polymer, emulsifier, oil and water.

U.S. Pat. No. 4,032,473—Berg et al, issued June 28, 1977 describe a water based defoamer composition containing a water insoluble mineral hydrocarbon, solid fatty acid diamide, hydrophobic silica particles and a nonionic emulsifier which is a stearyl alcohol ethoxylate. The composition is homogenized to obtain a stable pumpable emulsion having the appearance and consistency of heavy cream.

SUMMARY OF THE INVENTION

Water based defoamer compositions are prepared containing from about 0.5 to about 10% by weight of quick-chilled amide, about 0.3 to about 10% by weight of hydrophobic silica, about 0.5 to about 5% by weight of polymer, about 0.5 to about 5% by weight of emulsifier, about 15 to about 65% by weight of oil and about 20 to about 60% by weight of water. Optionally, these defoamer compositions may contain from about 0 to about 3% of silicone surfactant, about 0 to about 0.5% by weight of aqueous formaldehyde solution as a preservative and about 0 to about 0.5% by weight of silicone oil. These water based defoamer compositions contain less oil than commercial oil based products. Foam controlling amounts of water based defoamer compositions are added to aqueous systems containing foam producing solids to control or prevent foaming. These water based compositions are useful in defoaming in kraft brown stock washers and latex paints.

DESCRIPTION OF THE PREFERRED EMBODIMENTS

Water based defoamer compositions may be prepared using the indicated percentage by weight ranges of ingredients shown in the table.

|  | Indicated percentage by weight |
|---|---|
| quick-chilled amide | 0.5–10 |
| hydrophobic silica | 0.3–10 |
| polymer | 0.5–5 |
| emulsifier | 0.5–5 |
| oil | 15–65 |
| water | 20–60 |
| silicone surfactant | 0–3 |
| formaldehyde solution | 0–0.5 |
| silicone oil | 0–0.5 |

Properties of each ingredient are described in detail below.

Quick-chilled solid amides useful in this invention may be prepared by reaction of a polyamine containing at least one alkylene group having from two to ten carbon atoms and a fatty acid having from six to eighteen carbon atoms. Generally, the polyamine and fatty acids are reacted together in stoichiometrically equivalent amounts. For example, the amide can be obtained by reaction of a polyamine with a fatty acid or mixture of fatty acids such as hexanoic, decanoic, lauric, palmitic, oleic and stearic acids, hydroxy acids such as ricinoleic acid or naphthenic acids obtained as by-products in the refining of petroleum. Natural mixtures of fatty acids such as tall oil acids, tallow fatty acids and the like can be used. Suitable amines include ethylene diamine, butylene diamine, diethylene triamine, triethylene tetramine, hexamethylene diamine, decamethylene diamine, hydroxyethyl ethylene diamine, 1,3-diamine-2-propanol and the like.

An amide useful herein is hydrogenated tallow diamide of ethylene diamine. It was prepared by charging 95.7 parts by weight of bleached-hydrogenated tallow fatty acids into a stainless steel reactor equipped with condenser, water trap and agitator. The entire process including charging of reactants and cooling of the reaction product is carried out under a nitrogen atmosphere. The acids are then heated to about 165° C. to about 175° C. and 10.1 parts by weight of ethylene diamine is added. After the diamine is added, the reaction mixture is heated with agitation to about 170° C. to about 185° C. The mixture is reacted at about 180° C. to about 185° C. until the acid value is less than 5 and the alkalinity less than 0.6% by weight. The resulting reaction product of ethylene diamine and tallow fatty acid is then cooled to room temperature and used in the "Quick-Chilling" Process described below. If desired, the cooled reaction product can be ground to obtain the amide in the form of a very fine powder. One or a mixture of amides can be used if desired.

The "Quick-Chilling" Process used herein is essentially the same as that described in U.S. Pat. Nos. 3,652,453—MacDonnell, issued Mar. 28, 1972 and 3,677,963—Lichtman et al, issued July 18, 1972, which descriptions are hereby incorporated by reference. In the quick-chilling process used in this invention the amide is combined with other ingredients such as the polymer, silicone surfactant and oil in the melt. The quick-chilling process consists of heating the amide and the other ingredients to the above its melting point, maintaining the amide in a molten state for at least 15 minutes, and then rapidly quick-chilling the amide by: (a) adding a colder liquid such as oil or water; (b) rapidly dropping the melt into colder liquid; or (c) applying the melt to a cold surface and adding the resulting coagulate to the liquid. Optionally, the amide may be mixed with some of the liquid before heating, in which case the mixture should be heated to a temperature where the amide is fully dissolved and then maintained at that temperature for at least 15 minutes. It is important in either case that the amide be heated long enough for any crystalline nuclei to be destroyed, so that the amide may more readily assume the desired new crystalline structure formed by the quick-chilling process. The term "colder" is defined as room temperature (22° C.) or below.

Hydrophobic silica useful herein may be prepared from any of the well-known forms of silica such as: (1) silica aerogel, a colloidal silica prepared by displacing the water from a silica hydrogel by a low-boiling, water-miscible, organic liquid, heating in an autoclave or the like above the critical temperature of the liquid, and then venting the autoclave, (2) fume silica, a colloidal silica obtained by burning silicon tetrachloride and collecting the resulting silica smoke, (3) precipitated silica prepared by destabilization of a water-soluble silica under conditions which do not permit the formation of a gel structure, but rather cause the flocculation of silica particles into coherent aggregates such as by the addition of sodium ions to a sodium silicate solution; as well as aluminum silicate, copper silicate, magnesium silicate, zinc silicate, and the like. Almost any grade and particle size of silica is useful although finer particles are preferred. Hydrophilic inorganic particles which might be expected to be silica substitutes such as calcium hydroxide, magnesium hydroxide and calcium carbonate were found not to be useful.

Any suitable method may be employed for treating the normally hydrophilic silica to render it hydrophobic. One method which has proved very satisfactory involves spraying the silica with silicone oil and heating at elevated temperature, i.e., from about 250° C. to about 350° C., for about ½ to about 2 hours. The amount of silicone oil utilized may vary from about 5% to about 100% by weight based on the weight of the silica. However, amounts from about 7 to about 25% will usually be satisfactory and are preferred.

The silicone oil can be a polysiloxane oil such as an alkyl, aryl, alicyclic or aralkyl siloxane or polysiloxane having a viscosity of from about 10 to about 3000 centistokes at 25° C. Preferred silicone oils include alkyl polysiloxanes having viscosities of from about 40 to about 100 centistokes at 25° C. These alkyl polysiloxanes include dimethyl polysiloxane, diethyl polysiloxane, dipropyl polysiloxane, methyl ethyl polysiloxane, dioctyl polysiloxane, dihexyl polysiloxane, methyl propyl polysiloxane, dibutyl polysiloxane, didodecyl polysiloxane, methyl phenyl polysiloxane or the like.

The finely divided silica may also be rendered hydrophobic by treatment with vapors of an organo-silicon halide or mixture of organo-silicon halides. Examples of suitable organo-silicon halides are given in U.S. Pat. Nos. 2,306,222 and 2,412,470 and include alkyl (methyl), aryl (phenyl), alkaryl (tolyl) and aralkyl (phenyl methyl) silicon halides. The treatment may be carried out by agitating the finely divided material in a closed container in the presence of vapors of the treating material, e.g., dimethyl dichlorosilane. The amount of treating material and length of treatment will depend upon the surface area of the inorganic material and nature of the organo-silicon halide employed. In general, it will be satisfactory to use from about 5 to about 30% by weight of treating agent based on the weight of silica and a time of treatment from about ½ hour to about 2 hours.

Still another method of rendering the silica hydrophobic is by dispersing it in silicone oil, i.e., in a concentration from about 2–10% and heating the dispersion to about 250°–300° C. for about an hour more or less. The hydrophobic silica may then be extracted by centrifuging the mixture after dilution with hexane or a similar type of solvent and drying the resulting solid.

The hydrophobic silica utilized will desirably have an average particle size less than about 10 microns and preferably less than about 5 microns. Most preferred is an average particle size from about 0.02 micron to about 1 micron. Where particle size of the silica is measured in terms of Oil Absorption Value, 125 g of oil absorbed per 100 g of silica is the minimum useful value and 170 or higher value is preferred. The hydrophobic silica is dispersed in oil to obtain a dispersion of from about 10 to about 15% by weight silica which is added as a component C ingredient.

Polymers useful herein include vinyl acetate copolymerized with ethylenically unsaturated comonomers which are copolymerizable therewith such as maleic and fumaric acid esters, ethylene, propylene and butylene; polyalkylene oxide adducts such as methyl glucoside propoxylated with 4 moles of propylene oxide; glycerine alkoxylated with 15 moles of ethylene oxide and 45 moles of propylene oxide; butanol propoxylated with 30 moles of propylene oxide; the copolymer of lauryl methacrylate and vinyl pyrrolidone; methacrylate copolymers dissolved in solvent-refined (100 SUS at 38° C.) neutral oil; and phenol modified coumaroneindene resins. These materials can be used alone or in admixture with each other.

One oil soluble polymer which is preferred is a copolymer of vinyl acetate and fumaric acid esterified with a tallow alcohol. Such an oil soluble polymer is available from Exxon Chemical Co. in the form of a mineral oil solution thereof under the trademark "Paratone 440" which consists of about 25 parts by weight of said copolymer in 75 parts by weight of a liquid hydrocarbon. This product has the following properties:

| | |
|---|---|
| Viscosity at 98.9° C., cs | 1300 |
| Flash Point, COC, ° C. | 182 |
| Color, ASTM | 40 |
| Specific Gravity at 15.6° C. | 0.92 |

Another preferred oil soluble polymer is a copolymer of styrene and a polyester. Such an oil soluble polymer is available from The Lubrizol Corporation in the form of a paraffin oil solution thereof under the trademark "Lubrizol 3702" consists of about 30 parts by weight of said copolymer in 70 parts by weight of liquid hydrocarbon. This product has the following properties:

| | |
|---|---|
| Viscosity at 98.9° C., SUS | 3800 |
| Viscosity at 98.9° C., cSt | 815 |
| Specific Gravity 15.6° C. | 0.905 |

Still another preferred oil soluble polymer is a copolymer of alkyl methacrylate and N-vinyl pyrrolidone. Such an oil soluble polymer is available from Rohm and Haas Company in the form of a neutral oil solution thereof under the trademark "Acryloid 966" which consists of about 30 parts by weight of said copolymer in 70 parts by weight of liquid hydrocarbon. This product has the following properties:

| | |
|---|---|
| Viscosity at 98.9° C., SUS | 3730 |
| Viscosity at 98.9° C., cSt | 800 |
| Flash Point, COC,°C. | 192.5 |
| Color, ASTM | 3 |
| Specific Gravity at 15.6° C. | 0.899 |

The emulsifier may be a nonionic, anionic or cationic surfactant. Useful nonionic surfactants include castor oil plus 15 EO (one mole of castor oil condensed with 15 moles of ethylene oxide), nonylphenol plus 1.5 EO, hexadecylphenol+5 EO or the Pluronics. Suitable ethylene oxide condensates may be prepared by condensing ethylene oxide with any organic compound having a reactive hydrogen and a hydrophobic moiety containing at least 10 carbon atoms. Useful condensates include ethoxylated alkylphenols, aliphatic alcohols, fatty acids, amines, esters or amides of fatty acids having at least 10 carbon atoms in the hydrophobic moiety or polyoxypropylene glycol. Ethylene oxide condensates are well known and are used extensively as nonionic surfactants. Additional details on other useful nonionic surfactants as well as suitable anionic and cationic surfactants may be found in U.S. Pat. No. 4,021,365—Sinka and Lichtman issued May 3, 1977, whose teachings are incorporated by reference herein.

The oil used in the defoamer composition may be any liquid aliphatic, alicyclic, aromatic hydrocarbon. The hydrocarbon should be liquid at room temperature and atmospheric pressure, have a viscosity of from about 30 to about 400 SUS (Saybolt Universal Seconds at 100° F.), a minimum boiling point of at least 150° F. and an average from about 6 to 25 carbon atoms. Suitable hydrocarbons include hexane, heptane, octane, dodecane, mineral seal oil, stoddard solvent, petroleum naphtha, benzene, toluene, xylene, paraffinic mineral oil, naphthenic mineral oil and their mixtures. When the oil is used in quick-chilling of the amide, the oil must have a minimum boiling point equal to the melting point of the amide. Triglycerides such as soya oil, rapeseed oil, etc. and fatty alcohols, Oxo bottoms and the like may be used instead of oil in the composition.

The silicone surfactant may be a polysiloxane-polyalkylene oxide copolymer such as silicone surfactant (a), a polydimethylsiloxane-polyalkylene oxide copolymer having a cloud point of 23° C. (1% solution in water). The polysiloxane-polyalkylene oxide copolymer may be silicone surfactant (b) having a cloud point of 36° C. or silicone surfactant (c) which is Union Carbide SAG5300 silicone antifoam having a cloud point of 38° C. (1% solution in water). Other useful polysiloxane-polyalkylene oxide copolymers include silicone surfactant (d) having a cloud point of 43° C. and silicone surfactant (e) having a cloud point of 41° C. (1% solution in water).

The formaldehyde solution used as a preservative may be a 37% aqueous solution of formaldehyde or an alcoholic solution containing an equivalent amount of formaldehyde. The term formaldehyde solution includes formaldehyde in the form of 30 to 40% aqueous solutions, 30 to 55% alcohol solution using alcohols such as methanol, butanol or isopropanol, polymeric forms such as paraformaldehyde, trioxane or hexamethylene tetraamine as well as chemical compounds such as acetals which will liberate formaldehyde.

The silicone oil may be a polysiloxane oil such as an alkyl, aryl, alicyclic or aralkyl siloxane or polysiloxane having a viscosity of from about 10 to about 3000 centistokes at 25° C. Preferred silicone oils include alkyl polysiloxanes having viscosities of from about 40 to about 1000 centistokes at 25° C. These alkyl polysiloxanes include dimethyl polysiloxane, diethyl polysiloxane, dipropyl polysiloxane, methyl ethyl polysiloxane, dioctyl polysiloxane, dihexyl polysiloxane, methyl propyl polysiloxane, dibutyl polysiloxane, diodecyl polysiloxane and the like, each having a viscosity of from about 10 to about 3000 centistokes at 25° C.

Useful water based defoamer compositions which are invert emulsions may be prepared with the above ingredients using the following procedure:

(A) mixing
  (a) from about 0.5 to about 10.0 percent by weight of an amide which is the reaction product of a polyamine containing at least one alkylene group having from two to ten carbon atoms and a fatty acid having from six to eighteen carbon atoms,
  (b) from about 0.5 to about 5.0 percent by weight of a polymer,
  (c) from about 1 to about 10 percent by weight of an oil, and
  (d) from about 0 to about 3 percent by weight of a silicone surfactant to obtain a mixture of the amide and the polymer in the oil and the surfactant;
(B) melting the mixture from step (A) by heating to a temperature not lower than the melting point of the highest melting ingredient and not higher than the flash point or point of decomposition of the least stable ingredient, whichever is lower;
(C) maintaining the melt at the temperature of step (B) after a clear, uniform melt has been obtained for a sufficient period to destroy any sub-visual crystalline nuclei of the amide remaining therein;
(D) quick-chilling the melt by
  (a) rapidly charging the same into a cooling oil present in an amount and at a temperature sufficient to hold the temperature of the cooling oil below the softening point of the amide after the melt is added thereto, and which is being continually agitated, thus forming an agglomerate which remains suspended therein, and cooling the agglomerate suspension of a quick-chilled amide to room temperature, or
  (b) rapidly charging the same onto a cold, heat conductive surface accompanied by vigorous stirring and spreading of the melt over the surface thus forming an agglomerate, scraping the agglomerate off the surface and charging it into a tank containing a cooling oil at room temperature, thus forming an agglomerate suspension of a quick-chilled amide;
(E) charging separately to the agitated suspension of amide from step (D)
  (a) from about 10 to about 60 percent by weight of oil, (b) from about 3 to about 70 percent by weight of hydrophobic silica in oil having from about 10 to about 15 percent by weight of silica, (c) from about 0.5 to about 5 percent by weight of an emulsifier, (d) from about 20 to about 60 percent by weight of water, and (e) from about 0 to about 0.5 percent by weight of formaldehyde to obtain a suspension;

(F) mixing the suspension from step (E) to obtain an emulsion, and (G) homogenizing the emulsion from step (F) to obtain a defoamer composition and then adding from 0 to about 0.5 percent by weight of silicone oil to the homogenized defoamer composition.

The viscosity range of the defoamer compositions in this invention is 200 to 4,000 cs, with the preferred range being 500 to 2000 cs.

The following test method may be used to determine effectiveness of the defoamer composition in reduction of and prevention of foam in brown stock washer liquor. Commercial brown stock washer liquor was used in the test described below.

The defoamer compositions of this invention are also useful in the reduction of existing foam (knock-down) and prevention of foam formation (hold-down) which occurs in brown stock washer liquor during the pulping process. When used for this purpose, from about 0.003 to about 0.5 parts by weight of defoamer solids are added to the pulp, per 100 parts by weight of dry pulp.

The following apparatus and test method was used in determining the effectiveness of various compositions in knocking down and holding down foam in brown stock washer liquor. The apparatus and method could, however, be used for testing any liquid which forms a foam upon agitation and/or heating.

A 1000 cc tall form beaker is used as the primary container for the liquid to be tested. A curved glass outlet fused onto the base of the beaker is connected with a rubber hose to a centrifugal pump. The pump is used to circulate continuously the test liquid from the beaker into the pump and back into the beaker. Pumping is carried out at a rate so that the test liquid in the beaker is agitated by the reentering test liquid to such an extent that foam forms. The pumping rate is about two gallons per minute. Test liquid enters the beaker at a point about 6 centimeters about the surface of the liquid in the beaker and strikes the surface of the liquid in the beaker at an angle of 90°.

In carrying out the testing of the defoamer compositions, 500 cc of freshly obtained concentrated brown stock washer liquor is charged at about 75° C. into the beaker. This liquid, when quiescent, fills the beaker to a level of about 8.3 centimeters from the bottom. This level is marked and labeled the 0 line. In the test for hold-down, 0.1 cc of defoamer composition is added to the 500 cc of test liquid in the beaker. The pump and stop watch are started simultaneously. Height of the foam about the 0 line is measured at 15 second intervals for the first minute, then at 30 second intervals, and recorded. In the test for knock-down, the liquor is agitated and heated prior to the addition of any defoamer composition. After a foam has built up to 8 centimeters, 0.1 cc of the defoamer composition to be tested is added and the data is recorded as above.

Test results using the above method are shown in Table II.

These tests demonstrate that the compositions of this invention are effective defoamers compared to existing commercial oil based defoamers containing quick-chilled amides.

The apparatus and method described above may also be used to evaluate the defoamer composition in any liquid which forms foam during agitation and/or heating.

Other aqueous systems which may be defoamed with these invert defoamer compositions include kraft screen room bleach plant applications, pulp and paper mill effluents, animal glues, other adhesives, latex, starches, other resinous systems, water base paints and the like.

For a fuller understanding of the nature and advantages of this invention, reference may be made to the following examples. These examples are given merely to illustrate the invention and are not to be construed in a limiting sense. All quantities, proportions and percentages are by weight and all references to temperature are °C. unless otherwise indicated.

EXAMPLE I

A defoamer composition was prepared using the indicated quantities (% by weight) of ingredients shown under Components A, B and C for Example I in Table I.

The Component A ingredients were charged to a kettle, heated to 150° C. to melt and mixed until uniform. The uniform molten Component A mixture was heated for 15 minutes at 145° C. and dropped into the Component B ingredient which had been previously cooled to 25° C.±2° C. to form a quick-chilled amide as described in U.S. Pat. No. 4,021,365—Sinka and Lichtman, issued May 3, 1977. Components A and B were blended for 15 to 30 minutes and temperature of the quick-chilled amide mixture was adjusted to below 50° C.

The ingredients shown in Component C in Example I in the Table were then added to the agitated Component A and B mixture. Paraffinic oil, paraffinic/napthenic oil, 14% hydrophobic silica by weight in oil and castor oil plus 15 EO condensate ingredients were added separately to the agitated Component A and B mixture. The water ingredient was then heated to 25°±3° C. and added slowly to the mixture to obtain an emulsion which was mixed until uniform. A total weight of 0.1% by weight aqueous formaldehyde solution was then added to the emulsion as a preservative and the emulsion mixed until homogeneous.

The homogeneous emulsion was homogenized in a Manton-Gaulin homogenizer at 1250±50 psi at 25° C.±3° C. and agitated for 15 minutes. Then 0.1% by weight of silicone oil was added and the mixture stirred for an additional 15 minutes to finish the defoamer composition.

EXAMPLES II–XI

Defoamer compositions were prepared using the indicated quantities (% by weight) of ingredients shown for Components A, B and C under Examples II through XI in Table I following the procedure given in Example I.

EXAMPLE XII

Emulsion defoamer compositions prepared in Examples I through XI were evaluated as defoamers for brown stock washer liquor using the procedure described in the specification. Results of these tests are shown in Table II as well as comparative tests with a commercial oil based product containing quick-chilled amides.

TABLE I

| | | DEFOAMER COMPOSITIONS (% by wt) | | | | | | | | | | |
|---|---|---|---|---|---|---|---|---|---|---|---|---|
| Component | Ingredient | I | II | III | IV | V | VI | VII | VIII | IX | X | XI |
| A | paraffinic oil | 2.0 | 2.5 | 2.5 | 2.5 | 2.0 | 2.0 | 2.0 | 2.0 | 2.0 | 2.0 | 2.0 |
| A | ethylene bisstearamide | 2.5 | 2.5 | 2.5 | 2.5 | 2.5 | 2.5 | 2.5 | 2.5 | 2.5 | 2.5 | 2.5 |
| A | polymethacrylate in oil | 3.0 | | | 1.0 | 3.0 | 3.0 | 3.0 | 4.5 | 3.0 | 3.0 | 3.0 |
| A | silicone surfactant (a) | 1.5 | | | | | | | | | | |
| A | silicone surfactant (b) | | 0.5 | 2.0 | | | 1.5 | | | | | |
| A | silicone surfactant (c) | | | | | 1.5 | | | | | | |
| A | silicone surfactant (d) | | | | | | | | | | 1.5 | |
| A | silicone surfactant (e) | | | | | | | | | | | 1.5 |
| A | butanol + 30 PO | | | | | | | 1.5 | | | | |
| A | vinyl acetate/tallow fumarate copolymer | | 2.0 | 2.0 | 2.0 | | | | | 1.5 | | |
| B | paraffinic oil | 21.0 | 22.5 | 21.0 | 22.0 | 21.0 | 21.0 | 21.0 | 21.0 | 21.0 | 21.0 | 21.0 |
| C | paraffinic/naphthenic oil | 5.0 | 5.0 | 5.0 | 5.0 | 5.0 | 5.0 | 5.0 | 5.0 | 5.0 | 5.0 | 5.0 |
| C | paraffinic oil | 6.0 | 6.0 | 3.0 | 6.0 | 6.0 | 6.0 | 6.0 | 6.0 | 6.0 | 6.0 | 6.0 |
| C | hydrophobic silica in oil | 8.0 | 8.0 | 11.0 | 8.0 | 8.0 | 8.0 | 8.0 | 8.0 | 8.0 | 8.0 | 8.0 |
| C | castor oil + 15 EO | 1.0 | 1.5 | 1.2 | 1.5 | 1.0 | 1.0 | 1.0 | 1.0 | 1.0 | 1.0 | 1.0 |
| C | water | 49.8 | 49.5 | 49.6 | 49.5 | 49.8 | 49.8 | 49.8 | 49.8 | 49.8 | 49.8 | 49.8 |
| C | formaldehyde solution | 0.1 | | 0.1 | | 0.1 | 0.1 | 0.1 | 0.1 | 0.1 | 0.1 | 0.1 |
| C | silicone oil | 0.1 | | 0.1 | | 0.1 | 0.1 | 0.1 | 0.1 | 0.1 | 0.1 | 0.1 |

TABLE II

HOLD-DOWN EFFICACY TESTS
With Georgia Brown Stock Washer Liquor
Dosage 100 μl (microliter)

| | Foam Level vs Time (Sec) | | | | | | | | |
|---|---|---|---|---|---|---|---|---|---|
| Defoamer Example | 15 | 30 | 45 | 60 | 75 | 90 | 120 | 150 | 180 |
| I | 18 | 5 | 8 | 10 | 13 | 18 | 20 | 28 | 30 |
| | 20 | 10 | 10 | 15 | 15 | 20 | 23 | 28 | 30 |
| Coml. oil based | 20 | 8 | 10 | 13 | 15 | 18 | 23 | 33 | 40 |
| | 20 | 8 | 10 | 10 | 15 | 15 | 20 | 28 | 35 |
| II | 30 | 20 | 25 | 38 | 48 | 55 | 70 | 80 | |
| III | 15 | 10 | 13 | 15 | 18 | 20 | 25 | 30 | 35 |
| | 15 | 10 | 13 | 15 | 18 | 20 | 25 | 30 | 35 |
| IV | 20 | 18 | 25 | 35 | 45 | 55 | 70 | 80 | |
| V | 20 | 8 | 8 | 10 | 15 | 18 | 23 | 30 | 35 |
| | 18 | 8 | 8 | 10 | 15 | 18 | 23 | 30 | 35 |
| VI | 15 | 8 | 10 | 10 | 15 | 18 | 23 | 30 | 35 |
| | 15 | 8 | 10 | 10 | 15 | 18 | 23 | 30 | 35 |
| VII | 10 | 5 | 10 | 10 | 15 | 18 | 23 | 30 | 35 |
| | 10 | 5 | 8 | 10 | 13 | 15 | 23 | 30 | 35 |
| VIII | 10 | 5 | 8 | 10 | 13 | 15 | 20 | 28 | 30 |
| | 10 | 5 | 8 | 10 | 13 | 15 | 20 | 28 | 30 |
| IX | 5 | 5 | 10 | 10 | 10 | 13 | 20 | 20 | 20 |
| | 5 | 5 | 10 | 10 | 10 | 13 | 20 | 20 | 20 |
| X | 15 | 10 | 10 | 13 | 15 | 18 | 23 | 28 | 33 |
| | 15 | 10 | 10 | 13 | 15 | 18 | 23 | 28 | 33 |
| XI | 10 | 5 | 5 | 8 | 10 | 10 | 13 | 15 | 20 |
| | 13 | 8 | 10 | 10 | 10 | 10 | 13 | 15 | 20 |

EXAMPLE XIII

This example demonstrates use of the defoaming compositions of Examples I and III as latex paint defoamers in the following Shaker Test.

Hold-down foam tests were conducted by adding 0.5% by weight of each defoamer composition based on the weight of latex to Rhoplex AC-490 (Rohm and Haas Company) acrylic latex. The defoamer composition was added to 125 cc of the latex weighed into a 250 cc can. Samples prepared with and without defoamer composition were shaken on a Red Devil paint shaker for 5 minutes. Immediately after shaking, the density (wt/gal) of each sample was determined. The decrease in density of each sample was compared with the control to determine the amount of air entrapped and the following results were obtained.

| | % Air Entrapped |
|---|---|
| Blank (No Defoamer) | 27.7 |
| 0.5% (by wt) of Example I | 15.2 |
| 0.5% (by wt) of Example III | 14.3 |

Results of these tests show that incorporation of 0.5% by weight of these defoamer compositions based on the weight of the latex to Rhoplex AC-490 resulted in substantial reductions in air entrainment.

EXAMPLE XIV

This example demonstrates use of the defoaming composition of Example I as a latex paint defoamer in the Shaker Test described in Example XIII with the exception that the latex was Rohm and Haas Company IG-90-1-interior gloss formulation and the defoamer concentration was 0.25% by weight based on the weight of latex. The decrease in density of the sample was compared with the control to determine the amount of air entrapped and the following results were obtained.

| | % Air Entrapped |
|---|---|
| Blank (No Defoamer) | 27.6 |
| 0.25% (by wt) of Example I | 8.5 |

Results of these tests show that incorporation of 0.25% by weight of the defoamer composition in the latex resulted in substantial reduction in air entrainment.

While the invention has been described with reference to certain specific embodiments thereof, it is understood that it is not to be so limited since alterations and changes may be made therein which are within the full and intended scope of the appended claims.

What is claimed is:

1. A water in oil emulsion defoamer composition comprising:
   (a) from about 0.5 to about 10 percent by weight of quick-chilled amide, which is a reaction product of a polyamide having at least one alkylene group of 2 to 10 carbon atoms and a fatty acid of from 6 to 18 carbon atoms, (b) from about 0.3 to about 10 percent by weight of hydrophobic silica (c) from about 0.5 to about 5 percent by weight of polymer selected from the group consisting of copolymer of vinyl acetate and fumaric acid esterified with tallow alcohol, copolymer of vinyl acetate with maleic acid esters, copolymer of vinyl acetate with ethylene, copolymer of vinyl acetate with propylene, copolymer of vinyl acetate with butylene, methyl glucoside alkoxylated with four moles of propylene oxide, glycerine alkoxylated with fifteen moles of ethylene oxide and forty-five moles of propylene oxide, butanol alkoxylated with thirty moles of propylene oxide, copolymer of lauryl methacrylate and vinyl pyrrolidone, methacrylate copolymer dissolved in refined oil, blown hydrogenated soya oil, blown vegetable oil, blown castor oil, soya alkyd, phenol modified coumarone indene resin, glycerol ester of gum rosin, glycerine ester of polyvinylpyrrolidone, lauric acid, palmitic acid, stearic acid, linseed oil, castor oil, lard and tallow, (d) from about 0.5 to about 5 percent by weight of emulsifier selected from the group consisting of nonionic, anionic acid cationic surfactants, (e) from about 15 to about 65 percent by weight of oil, (f) from about 20 to about 60 percent by weight of water, (g) from about 0 to about 3 percent by weight of silicone surfactant, (h) from about 0 to about 0.5 percent by weight of formaldehyde solution and (i) from about 0 to about 0.5 percent by weight of silicone oil.

2. The defoamer composition of claim 1 wherein the amide is the reaction produce of a polyamine selected from the group consisting of ethylene diamine, butylene diamine, diethylene triamine, triethylene tetramine, hexamethylene diamine, decamethylene diamine, hydroxyethyl ethylene diamine, and 1:3-diamino-2-propanol, and a fatty acid selected from the group consisting of hexanoic acid, decanoic acid, lauric acid, palmitic acid, oleic acid, stearic acid, ricinoleic acid, naphthenic acids, tall oil acid, tallow fatty acid, and hydrogenated tallow fatty acid.

3. The defoamer composition of claim 1 wherein the oil is selected from the group consisting of fuel oil, mineral seal oil, paraffinic oil, naphthenic oil, cyclohexane, xylene, toluene and dodecane.

4. The defoamer composition of claim 1 wherein the amide is ethylene bisstearamide, the polymer is polymethacrylate, and the emulsifier is castor oil alkoxylated with fifteen moles of ethylene oxide.

5. The defoamer composition of claim 4 wherein there is present about 2.5 percent by weight of amide, about 1.5 percent by weight of silicone surfactant, about 1.5 percent by weight of emulsifier, about 49.8 percent by weight of water and about 0.1 percent by weight of formaldehyde solution.

6. The defoamer composition of claim 1 wherein the amide is ethylene bisstearamide, the polymer is copolymer of vinyl acetate and fumaric acid esterified with tallow alcohol and the emulsifier is castor oil alkoxylated with fifteen moles of ethylene oxide.

7. The defoamer composition of claim 1 wherein there is present about 2.5 percent by weight of amide, about 1.5 percent by weight of silicone surfactant, about 1.5 percent by weight of emulsifier, about 49.8 percent by weight of water and about 0.1 percent by weight of formaldehyde solution.

8. The defoamer composition of claim 1 wherein the emulsifier is a nonionic surfactant.

9. The defoamer composition of claim 1 wherein the polymer is a copolymer of alkyl methacrylate and vinyl pyrrolidone.

10. The defoamer composition of claim 1 wherein the emulsifier is a nonionic surfactant and the polymer is a copolymer of alkyl methacrylate and vinyl pyrrolidone.

11. The process for preparing the water in oil emulsion defoamer composition of claim 1 comprising:

(A) mixing
  (a) from about 0.5 to about 10 percent by weight of an amide which is the reaction product of a polyamine containing at least one alkylene group having from two to ten carbon atoms and a fatty acid having from six to eighteen carbon atoms,
  (b) from about 0.5 to about 5.0 percent by weight of a polymer,
  (c) from about 1 to about 10 percent by weight of an oil, and
  (d) from about 0 to about 3 percent by weight of a silicone surfactant to obtain a mixture of the amide and the polymer in the oil and the surfactant;

(B) melting the mixture from step (A) by heating to a temperature not lower than the melting point of the highest melting ingredient and not higher than the flash point or point of decomposition of the least stable ingredient, whichever is lower;

(C) maintaining the melt at the temperature of step (B) after a clear, uniform melt has been obtained for a sufficient period to destroy any sub-visual crystalline nuclei of the amide remaining therein;

(D) quick-chilling the melt by
  (a) rapidly charging the same into a cooling oil present in an amount and at a temperature sufficient to hold the temperature of the cooling oil below the softening point of the amide after the melt is added thereto, and which is being continually agitated, thus forming an agglomerate which remains suspended therein, and cooling the agglomerate suspension of a quick-chilled amide to room temperature, or
  (b) rapidly charging the same onto a cold, heat conductive surface accompanied by vigorous stirring and spreading of the melt over the surface thus forming an agglomerate, scraping the agglomerate off the surface and charging it into a tank containing a cooling oil at room temperature, thus forming an agglomerate suspension of a quick-chilled amide;

(E) charging separately to the agitated suspension of amide from step (D)
  (a) from about 10 to about 60 percent by weight of oil,
  (b) from about 3 to about 70 percent by weight of hydrophobic silica in oil having from about 10 to about 15 percent by weight of silica,
  (c) from about 0.5 to about 5 percent by weight of an emulsifier,
  (d) from about 20 to about 60 percent by weight of water, and
  (e) from about 0 to about 0.5 percent by weight of formaldehyde to obtain a suspension;

(F) mixing the suspension from step (E) to obtain an emulsion, and (G) homogenizing the emulsion from step (F) to obtain a defoamer composition and then adding from 0 to about 0.5 percent by weight of silicone oil to the homogenized defoamer composition.

12. The defoamer composition produced by the process of claim 11.

13. The process of defoaming an aqueous system comprising adding a foam controlling amount of the defoamer composition of claim 1 to the aqueous system.

14. The method of defoaming brown stock washer liquor in papermaking comprising adding a foam controlling amount of the defoamer composition of claim 1 to the liquor.

15. The method of foam prevention in a water based protective coating comprising adding a foam controlling amount of the defoamer composition of claim 1 to the coating.

* * * * *